(12) United States Patent
Kamikura (10) Patent No.: US 7,862,759 B2
(45) Date of Patent: *__Jan. 4, 2011__

(54) METHOD OF MANUFACTURING LIQUID EJECTING HEAD

(75) Inventor: Hiroyuki Kamikura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 12/389,507

(22) Filed: Feb. 20, 2009

(65) Prior Publication Data

US 2009/0212460 A1 Aug. 27, 2009

(30) Foreign Application Priority Data

Feb. 21, 2008 (JP) .............................. 2008-040627

(51) Int. Cl.
*B29C 45/14* (2006.01)

(52) U.S. Cl. .................. 264/263; 264/275; 425/127; 425/129.1

(58) Field of Classification Search .................. None
See application file for complete search history.

(56) References Cited

U.S. PATENT DOCUMENTS

| 5,688,460 | A | * | 11/1997 | Ruschke | ............... | 264/263 |
| 6,415,121 | B1 | | 7/2002 | Suzuki | | |
| 2009/0122125 | A1 | | 5/2009 | Owaki et al. | | |
| 2009/0225142 | A1 | | 9/2009 | Kamikura | | |
| 2010/0071211 | A1 | | 3/2010 | Kobayashi et al. | | |

FOREIGN PATENT DOCUMENTS

| JP | 02-038377 | 2/1990 |
| JP | 2000-211130 | 8/2000 |
| JP | 2001-030297 | 2/2001 |
| JP | 2002-067312 | 3/2002 |
| JP | 2007-069434 | 3/2007 |
| JP | 2007-160821 | 6/2007 |
| JP | 2007-160863 | 6/2007 |

* cited by examiner

*Primary Examiner*—Edmund H. Lee
(74) *Attorney, Agent, or Firm*—Workman Nydegger (57) ABSTRACT

A method of manufacturing a liquid ejecting head and a supply member having a plurality of liquid supply passages is provided. The supply member includes first and second supply members in which liquid supply passages are provided and filters provided between the first supply member and the second supply member. The method includes: preparing a connected filter formed of a plurality of filter element portions corresponding to the plurality of liquid supply passages and a connecting portion that connects the plurality of filter element portions; in a state where the filter element portions of the connected filter are held between the first supply member and the second supply member, charging molten resin from a position corresponding to the connecting portion of the connected filter to separate the connecting portion; and, during the charging, molding.

7 Claims, 11 Drawing Sheets

METHOD OF MANUFACTURING LIQUID EJECTING HEAD

BACKGROUND

1. Technical Field

The invention relates to a method of manufacturing a liquid ejecting head that ejects liquid and, more particularly, to a method of manufacturing an ink jet recording head that discharges ink as liquid.

2. Related Art

In an ink jet recording head, which is a typical liquid ejecting head, generally, ink is supplied from an ink cartridge, which is a liquid reservoir portion and filled with ink, to a head element through an ink flow passage, which is formed in a supply member, such as an ink supply needle, which is an ink supply element and detachably inserted into the ink cartridge, and a cartridge case in which the ink cartridge is held, and the ink supplied to the head element is discharged from a nozzle by driving a pressure generating device, such as a piezoelectric element, provided for the head element.

In the above ink jet recording head, when bubbles that are present in ink contained in the ink cartridge or bubbles trapped into ink when the ink cartridge is attached or detached are supplied to the head element, the bubbles problematically cause defective discharge, such as dot omission. To solve the above problem, there is a technique that a filter is provided between an ink supply needle, inserted into an ink cartridge, and a supply member to remove bubbles, dust, or the like, in the ink (see JP-2000-211130, for example).

In addition, the above filter is fixed to the supply member by means of thermal welding, or the like, and the ink supply needle is fixed to the supply member by means of ultrasonic welding, or the like.

When small filters are separately prepared and attached to respective flow passages, it is difficult to handle the filters. Therefore, it is conceivable that a filter that covers a plurality of flow passages is used. However, in this case, there is a possibility that liquid that flows through different flow passages may leak through the filter.

SUMMARY

An advantage of some aspects of the invention is that it provides a method of manufacturing a liquid ejecting head that prevents leakage of liquid even with an easy-to-handle filter that covers a plurality of flow passages.

An aspect of the invention provides a method of manufacturing a liquid ejecting head that includes a head element having nozzle openings for ejecting liquid supplied from a liquid reservoir unit, which stores the liquid, and a supply member having a plurality of liquid supply passages, each of which supplies the liquid to a groups of the plurality of nozzle openings of the head element. The supply member includes first and second supply members in which the liquid supply passages are provided and filters provided between the first supply member and the second supply member. The method includes: preparing a connected filter formed of a plurality of filter element portions corresponding to the plurality of liquid supply passages and a connecting portion that connects the plurality of filter element portions; in a state where the filter element portions of the connected filter are held between the first supply member and the second supply member, charging molten resin from a position corresponding to the connecting portion of the connected filter to separate the connecting portion; and, during the charging, integrally molding an outer portion that fixes the first supply member, the second supply member and the filters.

According to the above aspect, the outer portion fixes and integrates the first supply member, the filters and the second supply member. This eliminates the necessity for regions for separately thermally welding the filters to the first supply member and to the second supply member. Thus, it is possible to reduce the interval between the adjacent supply elements by increasing the effective area of each filter and, therefore, the size of the head is reduced. In addition, it is not necessary to reduce the area of the filter for reducing the size of the head. This prevents an increase in dynamic pressure and, therefore, it is not necessary to increase a driving voltage at which a pressure generating device, such as a piezoelectric element or a heater element, is driven. Furthermore, the outer portion reliably is able to prevent occurrence of a gap between the supply element and the supply member, and the partition portion formed by separating the connecting portion is able to completely partition the filter element of each liquid supply portion. Thus, leakage of liquid through a gap may be reliably prevented, and leakage between the adjacent liquid supply passages may be prevented. In addition, it is not necessary to separately fix the filters respectively to the first supply member and to the second supply member. Thus, it is possible to reduce manufacturing cost.

Here, a partition portion molding portion, which is a cavity for molding a partition portion that partitions the filter element portions, may be formed in a region, corresponding to the connecting portion of the connected filter, of a die into which the molten resin is charged, and the connecting portion may be suspended within the partition portion molding portion when the connected filter is placed in the die. With this configuration, the connecting portion is further reliably separated by the pressure of molten resin and, therefore, it is possible to further completely partition the filters by the partition portion.

In addition, at least portion of the connecting portion of the connected filter may be formed in a strip element that is narrower than the filter element portions. With this configuration, when the outer portion is integrally molded, the connecting portion is further reliably separated by molten resin. Thus, it is possible to further reliably partition the filters by the partition portion.

In addition, tear-off lines that facilitates separation by pressure of the molten resin may be formed in the connecting portion of the connected filter. With this configuration, it is possible to mold the partition portion by further reliably separating the connecting portion at portions of the tear-off lines by pressure of molten resin. Thus, it is possible to further reliably partition the filters by the partition portion.

In addition, the connecting portion of the connected filter may be made of a material that melts by heat of the molten resin. With this configuration, it is possible to mold the partition portion by reliably separating the connecting portion in such a manner that the connecting portion melts by heat of molten resin. Thus, it is possible to further reliably partition the filters by the partition portion.

In addition, a through-hole may be formed in the connecting portion in a region corresponding to a charging hole through which the molten resin is charged.

In addition, each filter may have an outer shape corresponding to a filter holding portion of a peripheral portion of a corresponding one of the liquid supply passages, and the outer portion may extend continuously to an outer peripheral end surfaces of the filter in a gap between the first supply member and the second supply member. With this configuration, the outer peripheral end surfaces of each filter is covered with the outer portion while the area of the peripheral portion of each filter is minimized, and occurrence of a gap between the first supply member and the second supply member is reliably prevented. Thus, it is possible to further reliably prevent leakage of liquid through a gap.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the accompanying drawings.

First Embodiment

Figure 1:
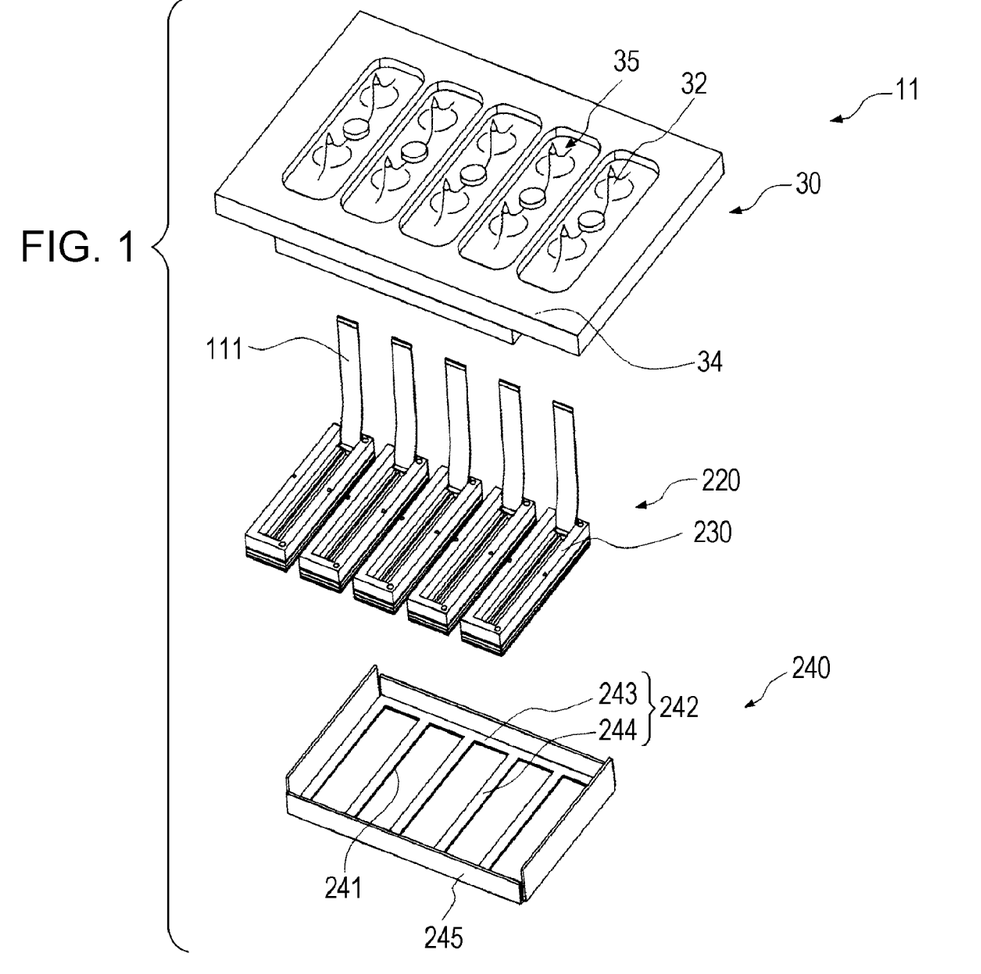
FIG. 1 is an exploded perspective view of a recording head according to a first embodiment of the invention.

FIG. 1 is an exploded perspective view of an ink jet recording head, which is an example of a liquid ejecting head manufactured by a method of manufacturing a liquid ejecting head, according to a first embodiment of the invention.

First, the configuration of the recording head 11 will be described. As shown in FIG. 1, the recording head 11 includes a supply member 30 such as a cartridge case, a head element 220, and a cover head 240. The ink cartridges 13, which are liquid reservoir portions, are fixed to the supply member 30. The head element 220 is fixed to a surface of the supply member 30, which is opposite to a side on which the ink cartridges 13 are fixed. The cover head 240 is provided on a liquid ejecting surface side of the head element 220.

Figure 2:
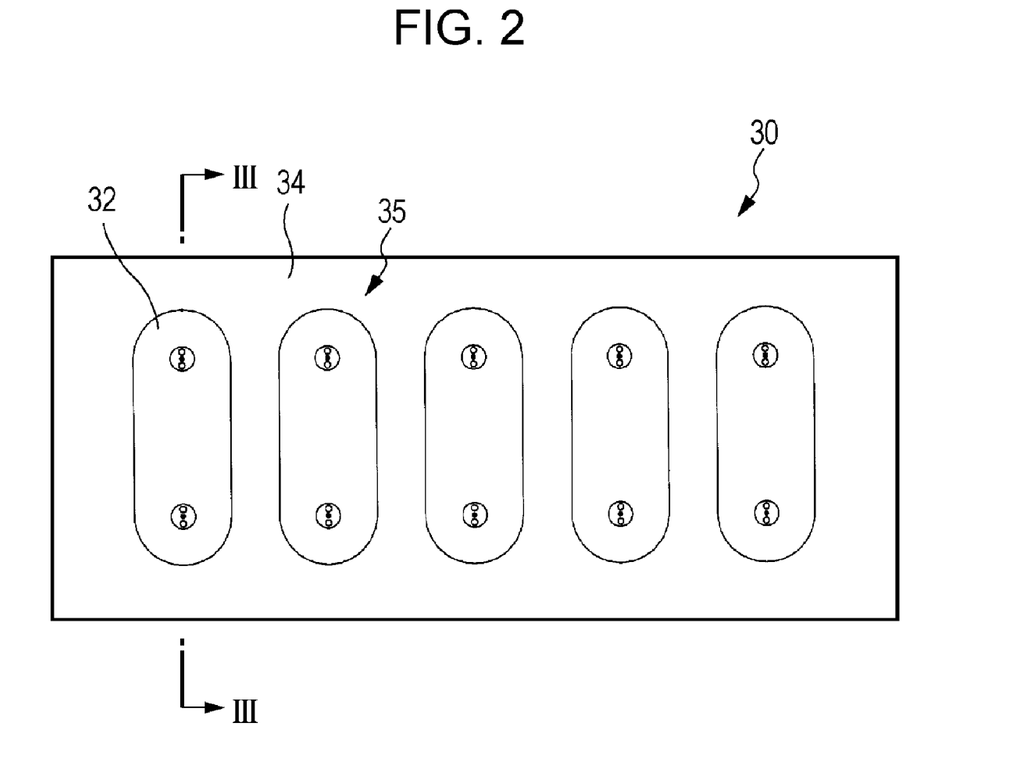
FIG. 2 is a top view of a supply member according to the first embodiment of the invention.

Here, the supply member 30 will be described in detail. Note that FIG. 2 is a top view of the supply member, FIG. 3 is a cross-sectional view that is taken along the line III-III in FIG. 2, and FIG. 4 is a view that illustrates a filter.

Figure 3:
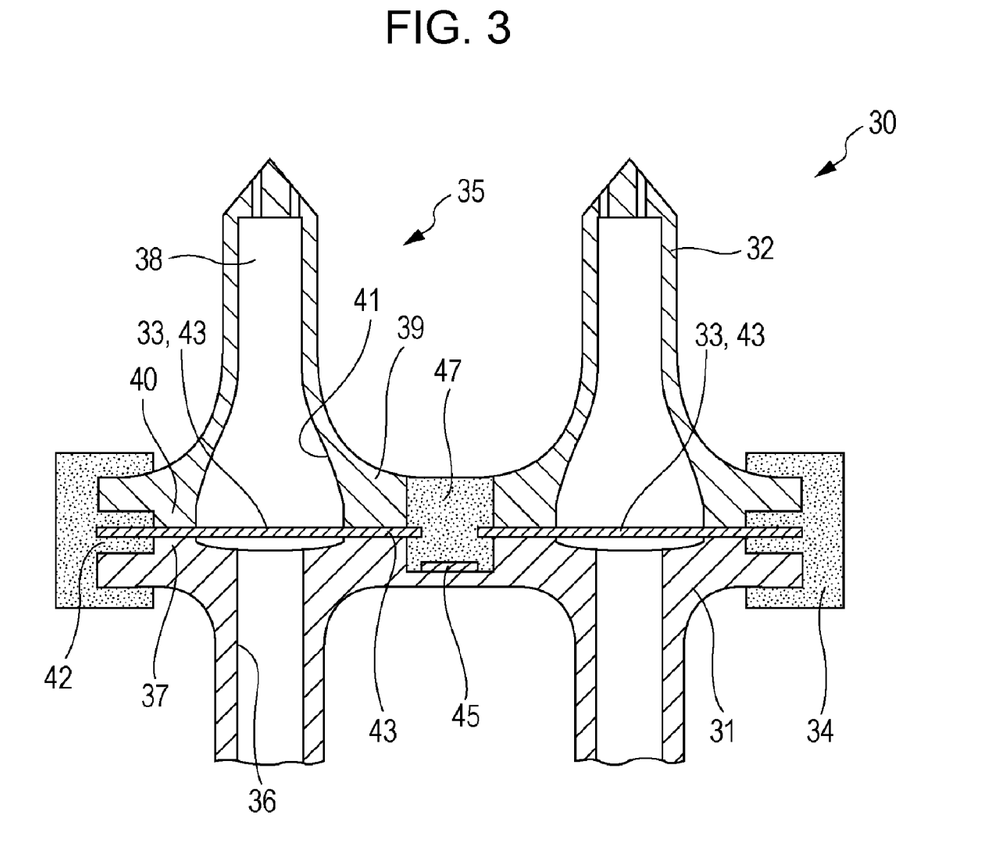
FIG. 3 is a cross-sectional view of the supply member according to the first embodiment of the invention.
Figure 4:
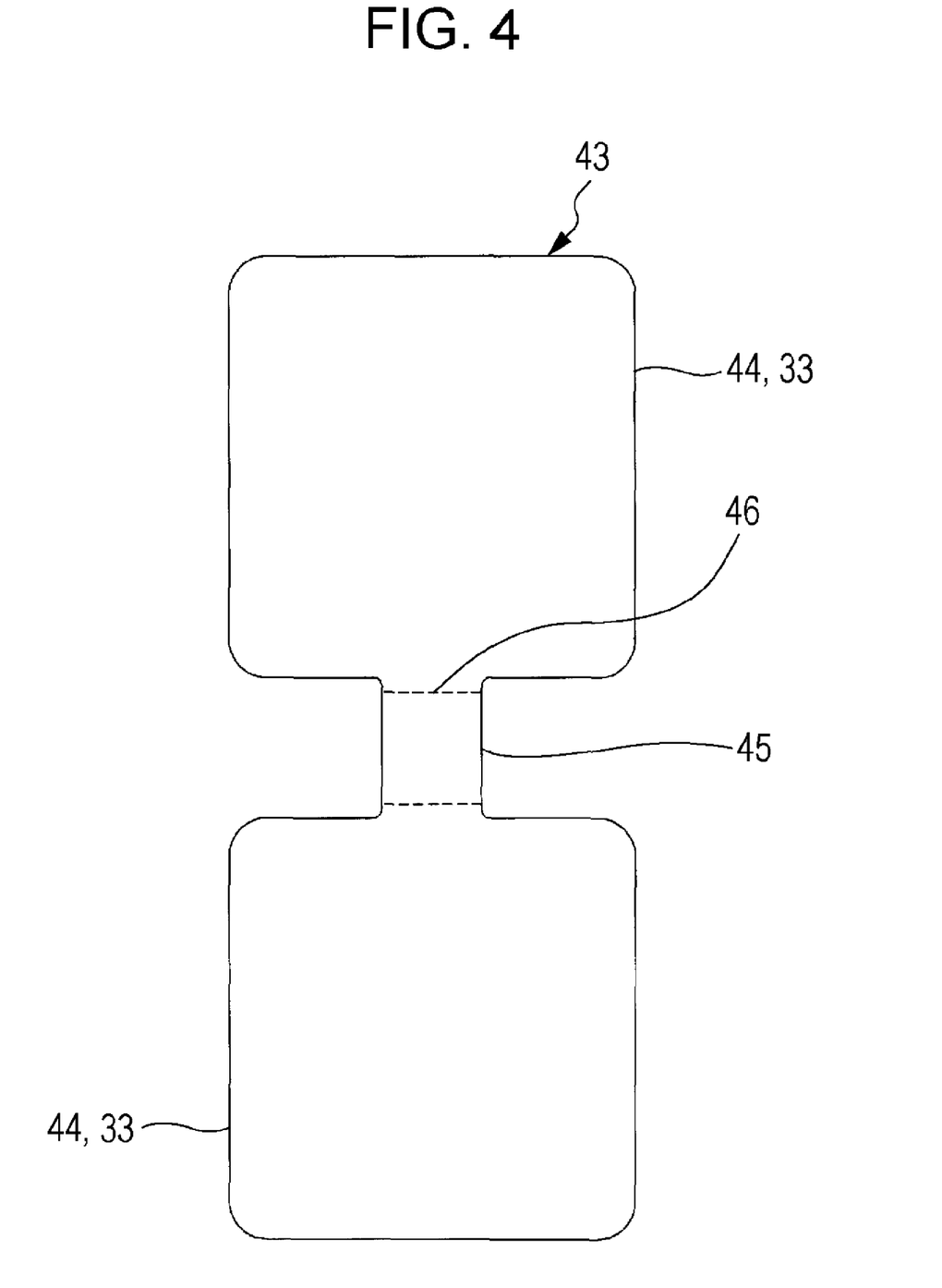
FIG. 4 is a plan view of a filter of the supply member according to the first embodiment of the invention.

As shown in FIG. 3, the supply member 30 is formed so that a filter is held between a first supply member and a second supply member. In the present embodiment, the supply member 30 includes a supply member element 31 that is located at the downstream side of a flow passage and that corresponds to any one of the first supply member and the second supply member; supply needles 32 that are provided at the upstream side of the flow passage with respect to the supply member element 31 and that correspond to the other one of the first supply member and the second supply member; a filter 33 that is provided between the supply member element 31 and the supply needles 32; and an outer portion 34 that is provided at the outer peripheries of the supply member element 31 and the supply needles 32.

The supply member 30 has supply element forming portions 35. The above described ink cartridges 13 (which correspond to "liquid reservoir units") are attached to one end surfaces of the supply element forming portions 35. Of course, it is applicable that the ink cartridges 13 are not directly attached to the supply element forming portions 35 but ink, which is liquid, is introduced from liquid reservoir units through tubes to the supply element forming portions 35 instead.

In addition, liquid supply passages 36 are formed in the supply member element 31 on the downstream side of the filter 33, which will be described later. One end of each liquid supply passage 36 is open to a corresponding one of the supply element forming portions 35, and the other end is open to the head element 220 side to thereby supply ink from the ink cartridges 13 to the head element 220. Note that the plurality of liquid supply passages 36 are provided so as to be arranged in the longitudinal direction of the supply member element 31, and the liquid supply passages 36 are independently provided for the respective ink cartridges 13 provided in one-to-one correspondence with the ink colors.

In addition, a projected portion 37 is provided for each supply element forming portion 35 of the supply member element 31 along the periphery of a region in which each liquid supply passage 36 opens. Each filter 33 is held between the projected portion 37 and the supply needle 32.

The supply needles 32, which are supply elements, are fixed to the surface of the supply member element 31 (supply element forming portion 35), and each have a through passage 40 that communicates with the corresponding liquid supply passage 36. The supply needles 32 supply the supply member element 31 with ink supplied from the ink cartridge 13.

In addition, each supply needle 32 has a flange portion 39 near an end adjacent to the supply member element 31. Each flange portion 39 has a projected portion 40 in a region corresponding to the projected portion 37 of the supply member element 31, and the filter is held between the projected portion 40 of the supply needle 32 and the projected portion 37 of the supply member element 31.

Note that in the present embodiment, two supply needles 32 are integrated to form a single member that integrates the two supply needles 32 for two liquid supply passages. That is, in the present embodiment, as shown in FIG. 2, five members are provided for ten liquid supply passages 36 (not shown).

In addition, a filter chamber 41 is provided in a region in which each through passage 38 of the supply needle 32 is connected to the corresponding liquid supply passage 36. Each filter chamber 41 is a space having larger in inner diameter than the other region, that is, a wide portion. In the present embodiment, each filter chamber 41 is, for example, formed so that the inner diameter increases toward the supply member element 31. Note that each filter chamber 41 is formed to have an inner diameter larger than the other region of the through passage 38 in order to reduce the resistance at the time when ink passes through as small as possible by increasing the area of the filter 33.

Each filter 33 is, for example, formed of a finely braided sheet-like metal, and is held between the supply member element 31 and the supply needle 32. In addition, in the present embodiment, each filter 33 has a size such that the filter 33 protrudes outside from the region held between the supply member element 31 and the supply needle 32. That is, each filter 33 is provided so as to protrude into an outer recess 42 defined by the projected portion 37 of the supply member element 31 and the projected portion 40 of the supply needle 32, and the projected portion 37 of the supply member element 31 and the projected portion 40 of the supply needle 32 form a filter holding portion that hold the filter 33.

The filters 33 have a continuous shape each for a plurality of the liquid supply passages 36. In the present embodiment, as the outer shape is shown in FIG. 4, a connected filter 43 that corresponds to the two liquid supply passages 36 is used. Here, the connected filter 43 includes two filter element portions 44 (which will be the filter 33 after molding the outer portion 34) corresponding to the two liquid supply passages 36, and a strip-shaped connecting portion 45 that connects these two filter element portions 44. The connecting portion 45 of the connected filter 43 has tear-off lines 46 formed of perforation in the present embodiment.

Thus, by providing the tear-off lines 46 at the connecting portion 45 of the connected filter 43, the connecting portion 45 is cut off at the tear-off lines 46 by molten resin that is charged at the time of molding the outer portion 34. Then, the filter element portions 44 are separated to form the filters 33 and, therefore, the filters 33 are reliably partitioned by a partition portion 47 that is molded together with the outer portion 34 at the same time. This will be described later in detail.

The outer portion 34 is made of resin that is integrally molded at the outer peripheries of the supply member element 31 and the supply needles 32. In the present embodiment, one outer portion 34 is provided around a boundary between the plurality of supply needles 32 and the supply member element 31.

The above outer portion 34 is provided at the outer peripheries of the supply member element 31 and the supply needles 32 over the end surfaces of the supply member element 31 and supply needles 32 and faces of the supply member element 31 and supply needles 32, opposite to a side on which the filters 33 are provided. Thus, the supply member element 31 and the supply needles 32 are fixed and integrated. That is, the outer portion 34 is formed by filling the recesses 42 defined by the projected portions 37 of the supply member element 31 and the projected portions 40 of the supply needles 32, and is provided so as to hold the filters 33 that protrude into the recesses 42.

In this way, the integrally molded outer portion 34 integrates the supply member element 31, the supply needles 32 and the filters 33. Thus, there is no need for regions for thermally welding the supply needles 32 and the filters 33 to the supply member element 31. This can reduce the interval between the adjacent supply needles 32, and the size of the head may be reduced. In addition, it is not necessary to reduce the area of each filter 33 for reducing the size of the head. This prevents an increase in dynamic pressure and, therefore, it is not necessary to increase a driving voltage at which the piezoelectric element 300 is driven. Furthermore, by forming the partition portion 47 that partitions the filters 33 together with the outer portion 34, the adjacent liquid supply passages 36 are reliably isolated. Thus, it is possible to reliably prevent leakage of liquid between the adjacent liquid supply passages 36.

In addition, by using the outer portion 34, the filters 33 and the supply needles 32 may be fixed to the supply member element 31 at the same time. Thus, it is not necessary to respectively fix the filters 33 and the supply needles 32 to the supply member element 31 and, therefore, manufacturing cost may be reduced.

Furthermore, the supply member element 31 is fixed to the supply needles 32 by the outer portion 34. Thus, occurrence of a gap between the supply member element 31 and the supply needles 32 is prevented and, therefore, it is possible to prevent leakage of ink through a gap.

Here, a method of manufacturing the above ink jet recording head 11, particularly, the supply member 30, will be described in detail. Note that FIG. 5A to FIG. 6 are cross-sectional views that show the method of manufacturing the supply member.

Figure 5A:
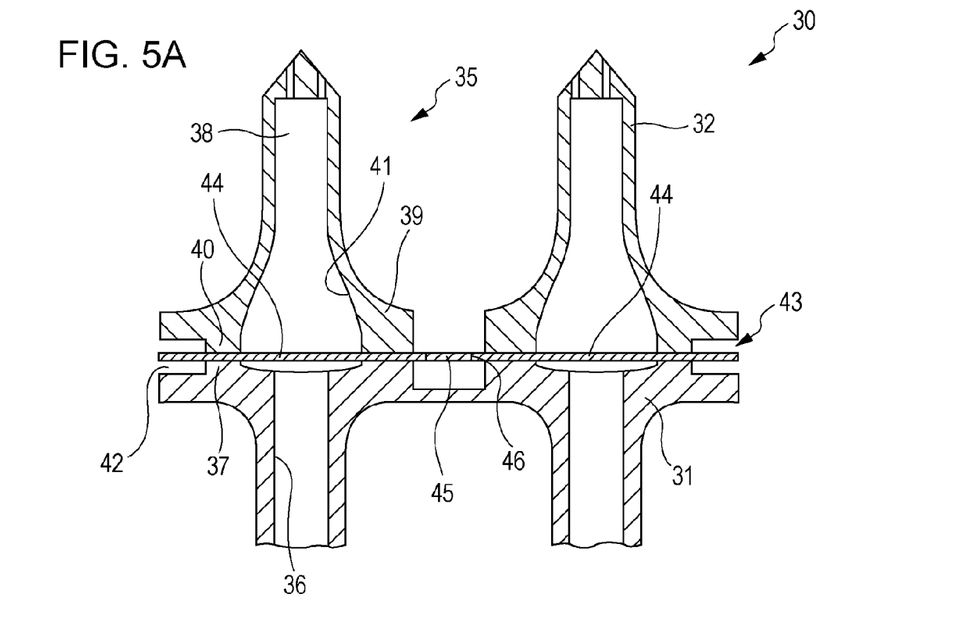
FIG. 5A and FIG. 5B are cross-sectional views that show a method of manufacturing the supply member according to the first embodiment of the invention.

First, as shown in FIG. 5A, the connected filter 43 is held between the supply member element 31 and the supply needles 32. That is, the projected portions 37 of the supply member element 31 are brought into contact with the projected portions 40 of the supply needles 32 via the filter element portions 44 of the connected filter 43.

Figure 5B:
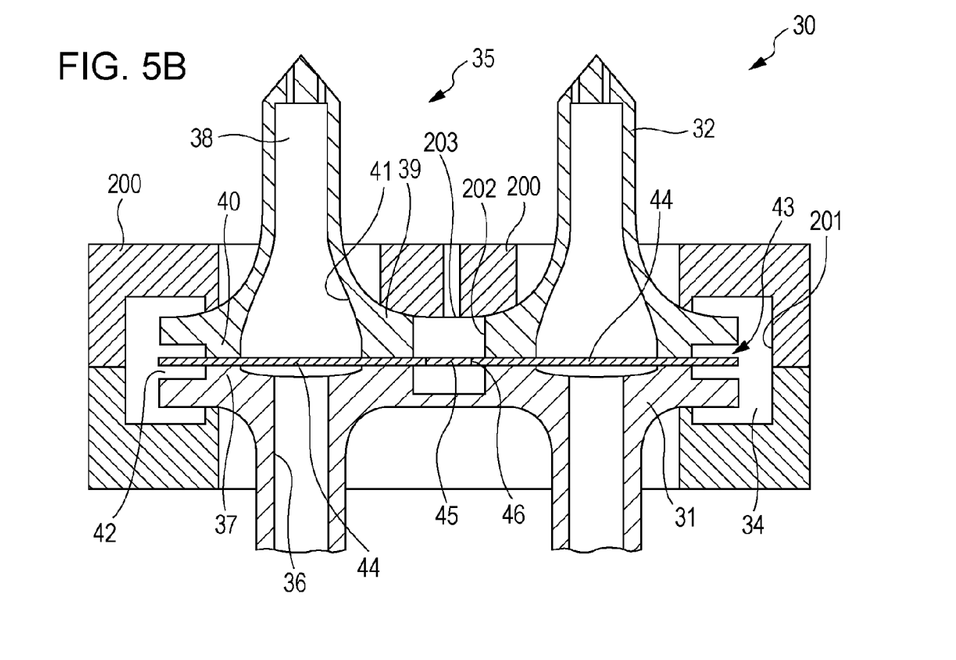

Next, as shown in FIG. 5B, a die 200 is fitted over the outer peripheries of the boundary between the supply member element 31 and the supply needles 32. The die 200 is formed of upper and lower divided members, and has a cavity 201 for forming the outer portion 34 and a cavity 202 for forming the partition portion 47 inside. In addition, the die 200 has a charging hole 203 for charging molten resin into a region corresponding to the cavity 202. The charging hole 203 communicates with a gate through which molten resin is charged from the outside.

Figure 6:
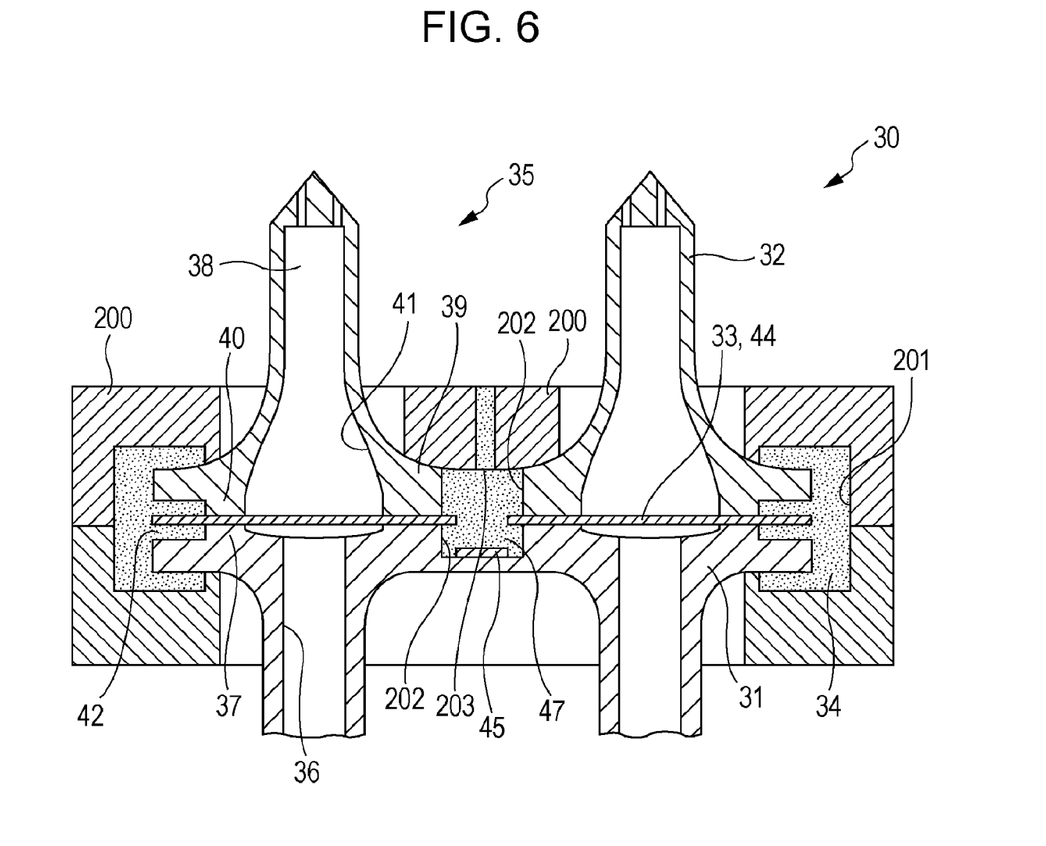
FIG. 6 is a cross-sectional view that shows a method of manufacturing the supply member according to the first embodiment of the invention.

Then, as shown in FIG. 6, the outer portion 39 is integrally molded to thereby form the supply member 30. Specifically, molten resin is charged through the charging hole 203 of the die 200 into the cavity 202 and the cavity 201. By so doing, molten resin collides with the connecting portion 45 that is placed so as to face the charging hole 203 while being suspended within the cavity 202, and the connecting portion 45 is cut off at the tear-off lines 45 by the pressure of molten resin, thus molding the partition portion 47. In addition, the outer portion 34 is molded by molten resin that flows through the cavity 202 into the cavity 201. In addition, at this time, molten metal charged into the cavities 201 and 202 is also charged into micropores of the filter element portion 44, and is charged over the regions between the projected portions 37 of the supply member element 31 and the projected portions 40 of the supply needles 32, that is, the region in which the filter element portions 44 are held between the supply member element 31 and the supply needles 32.

Thus, the outer portion 34 is provided around the liquid supply passages 36 to fix and integrate the supply member element 31, the supply needles 32 and the filters 33. In addition, the filters 33 are separated for each liquid supply passage 36, and the liquid supply passages 36 are isolated by being reliably partitioned by the partition portion 47. Thus, leakage of liquid does not occur between the adjacent liquid supply passages 36.

Note that as described above, because the connecting portion 45 of the connected filter 43 of the present embodiment is cut off by the pressure of resin charged, resin easily flows to the upper and lower sides of the filters 33 within the cavity 201 of the die 200. Thus, it is possible to easily charge molten resin into the die 200. In addition, a through-hole may be provided for the connecting portion 45 to facilitate molten resin to further easily enter into the lower side of the filters 33. In any case, by charging resin over the regions between the projected portions 37 of the supply member element 31 and the projected portions 40 of the supply needles 32, it is possible to seal the liquid supply passages 36 by the outer portion 34.

The thus formed supply member 30 eliminates the necessity of a process of thermally welding the filters 33 and the supply needles 32 respectively to the supply member element 31, and allows the supply member element 31, the supply needles 32 and the filters 33 to be fixed and integrated in one process in which the outer portion 34 is integrally molded. Thus, manufacturing process is simplified and, therefore, cost may be reduced.

Figure 7:
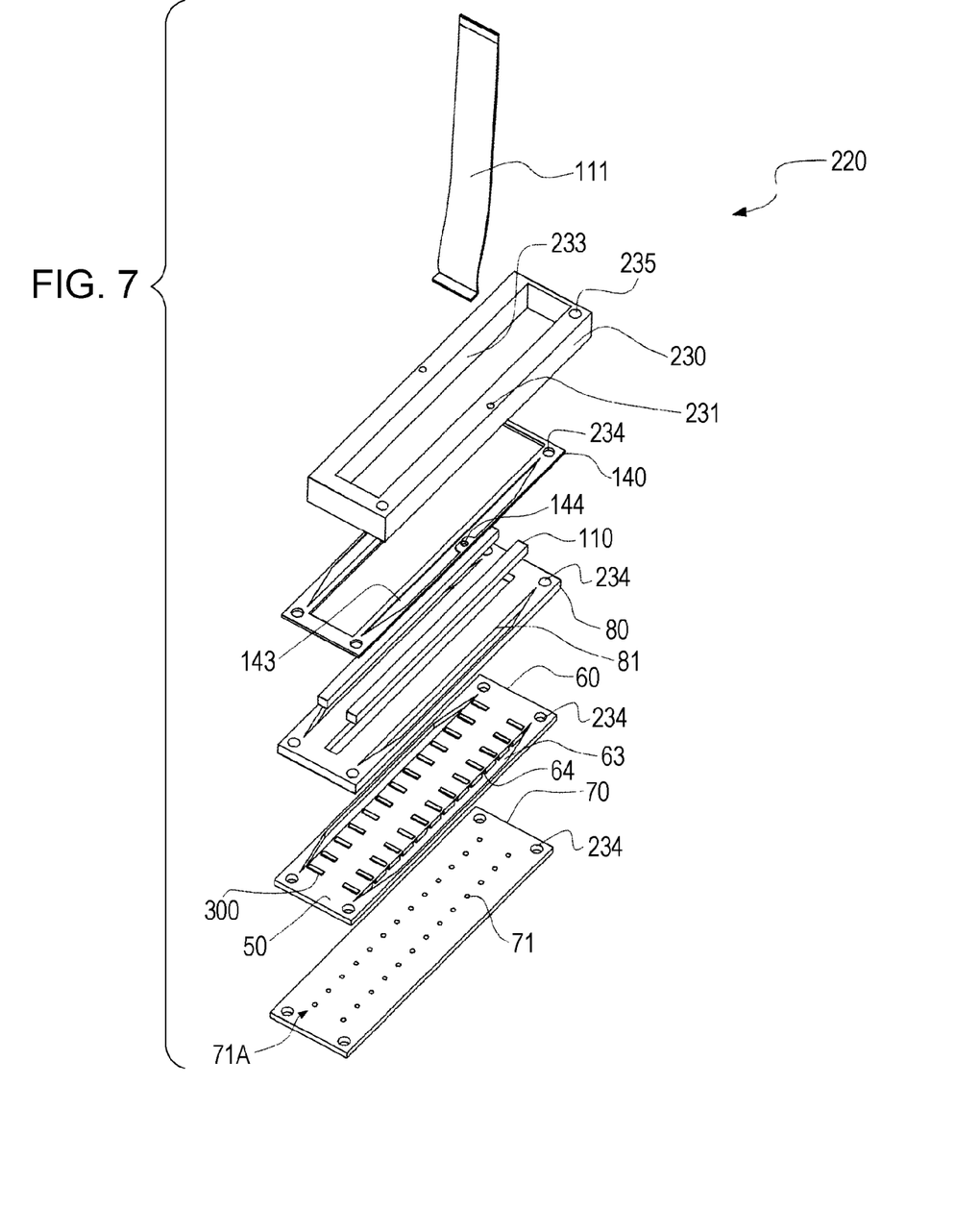
FIG. 7 is an exploded perspective view that shows a head element according to the first embodiment of the invention.
Figure 8:
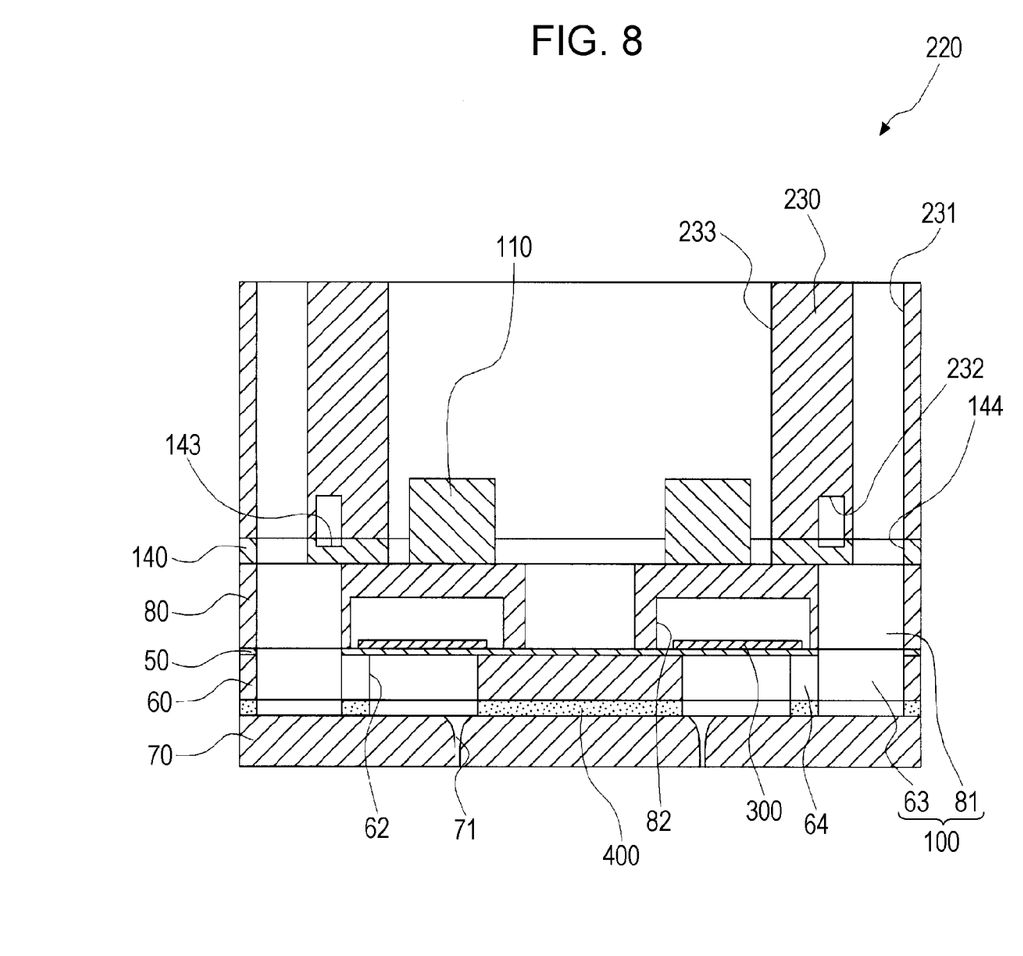
FIG. 8 is a cross-sectional view that shows the head element according to the first embodiment of the invention.

In addition, the head element 220 is provided on the other side of the liquid supply passages 36 of the supply member 30, that is, on a side of the supply member 30, which is opposite to a side on which the supply needles 32 are provided. Here, the head element 220 will be described. Note that FIG. 7 is an exploded perspective view of the head element, and FIG. 8 is a cross-sectional view of the head element.

As shown in the drawings, in the present embodiment, a flow passage forming substrate 60 that constitutes the head element 220 is a silicon single crystal substrate, and an elastic film 50 made of silicon dioxide is formed on one end surface. The flow passage forming substrate 60 has pressure generating chambers 62, which are formed by anisotropic etching from the other end surface and defined by a plurality of partition walls. The pressure generating chambers 62 are arranged in two lines that are parallel to each other in the widthwise direction. In addition, a communication portion 63 is formed at the longitudinal outer side of each line of pressure generating chambers 62, and communicates with a reservoir portion 81, provided in a reservoir forming substrate 80, which will be described later, to constitute a reservoir 100, which is an ink chamber common to the pressure generating chambers 62. In addition, the communication portion 63 communicates with the longitudinal one end of each pressure generating chamber 62 through an ink supply passage 64. That is, in the present embodiment, the pressure generating chambers 62, the communication portions 63 and the ink supply passages 64 are provided as liquid flow passages formed in the flow passage forming substrate 60.

In addition, a nozzle plate 70, in which nozzle openings 71 are formed, is bonded by an adhesive agent 400 to an opening surface side of the flow passage forming substrate 60. Specifically, a plurality of the nozzle plates 70 are provided in correspondence with a plurality of the head elements 220, and each nozzle plate 70 has an area slightly larger than an exposed opening portion 241 of the cover head 240, which will be described later, and is fixed in a region that overlaps the cover head 240 by an adhesive agent, or the like. Note that the nozzle openings 71 of each nozzle plate 70 are formed at positions that communicate with the pressure generating chambers 62 at the opposite side with respect to the ink supply passages 64. In the present embodiment, because two parallel lines of the pressure generating chambers 62 are provided in the flow passage forming substrate 60, two parallel lines of nozzle columns 71A in which the nozzle openings 71 are arranged are provided in each head element 220. Then, in the present embodiment, a surface of the nozzle plate 70, on which the nozzle openings 71 are open, is a liquid ejecting surface. The above nozzle plate 70 is, for example, a silicon single crystal substrate or a metal substrate made of stainless steel (SUS), or the like.

On the other hand, piezoelectric elements 300 are formed on a side of the flow passage forming substrate 60, which is a side opposite to the opening surface. Each of the piezoelectric elements 300 is formed so that a lower electrode film made of metal, a piezoelectric element layer made of piezoelectric material such as lead zirconate titanate (PZT), and an upper electrode film made of metal are sequentially laminated on the elastic film 50.

The reservoir forming substrate 80 having the reservoir portions 81 that at least partially constitute the reservoir 100 is bonded onto the flow passage forming substrate 60 on which the above piezoelectric elements 300 are formed. In the present embodiment, the reservoir portions 81 each extend through the reservoir forming substrate 80 in the thickness direction and are formed in the widthwise direction of the pressure generating chambers 62. The reservoir portions 81 each communicate with the corresponding communication portion 63 of the flow passage forming substrate 60 to form the reservoir 100, which is the ink chamber common to the pressure generating chambers 62.

In addition, piezoelectric element holding portions 82 are provided in regions that face the piezoelectric elements 300 of the reservoir forming substrate 80, and have a space with a size that does not interfere with movement of the piezoelectric element 300.

Furthermore, a driving circuit 110 formed of a semiconductor integrated circuit (IC), or the like, for driving the piezoelectric elements 300 is provided on the reservoir forming substrate 80. Each of the terminals of the driving circuit 110 is connected to a lead wire that is extended from an individual electrode of each piezoelectric element 300 through a bonding wire (not shown), or the like. Then, each terminal of the driving circuit 110 is connected to the outside through an external wiring 111, such as a flexible printed circuit substrate (FPC), and receives various signals, such as a print signal, through the external wiring 111 from the outside.

In addition, a compliance substrate 140 is bonded onto the reservoir forming substrate 80. Ink introducing ports 144 for supplying ink to the reservoirs 100 are formed in regions of the compliance substrate 140, facing the reservoirs 100, so as to extend through the compliance substrate 140 in the thickness direction. In addition, the regions of the compliance substrate 140, facing the reservoirs 100, other than the ink introducing ports 144, are flexible portions 143 that are formed to be thin in the thickness direction, and the reservoirs 100 are sealed by the flexible portions 143. The flexible portions 143 give compliance to the insides of the reservoirs 100. In addition, a head case 230 is fixed onto the compliance substrate 140.

The head case 230 has ink supply communication passages 231 that respectively communicate with the ink introducing ports 144, and that communicate with the liquid supply passages 36 of the supply member 30 to thereby supply ink from the supply member 30 to the ink introducing ports 144. Grooves 232 are formed in the head case 230 in regions that face the flexible portions 143 of the compliance substrate 140 to allow appropriate flexible deformation of the flexible portions 143. In addition, the head case 230 includes driving circuit holding portions 233 that extend through in the thickness direction in regions facing the driving circuit 110 provided on the reservoir forming substrate 80, and the external wiring 111 is inserted through the driving circuit holding portion 233 and connected to the driving circuit 110.

In addition, as shown in FIG. 1, the head elements 220, each of which is held by the supply member 30 through the head case 230, are relatively positioned and held by the boxshaped cover head 240 so as to cover the liquid ejecting surface sides of the five head elements 220. The cover head 240 includes the exposed opening portions 241 that expose the nozzle openings 71 and bonded portions 242 that define the exposed opening portions 241 and that are at least bonded to both ends of the liquid ejecting surface, on which the nozzle columns 71A of the nozzle openings 71 are arranged parallel to each other, of each head element 220.

In the present embodiment, the bonded portion 242 is formed of a frame portion 243 provided along the outer periphery of the liquid ejecting surface over the plurality of head elements 220 and beam portions 244 that extend between the adjacent head elements 220 to divide the exposed opening portions 241. The frame portion 243 and the beam portions 244 are bonded onto the liquid ejecting surfaces of the head elements 220, that is, the surfaces of the nozzle plates 70.

In addition, the cover head 240 includes a side wall portion 245 at the sides of the liquid ejecting surfaces of the head elements 220. The side wall portion 245 extends so as to bend along the outer peripheral portion of the liquid ejecting surfaces.

Thus, the cover head 240 is formed so that the bonded portion 242 is bonded to the liquid ejecting surfaces of the head elements 220, so it is possible to reduce a step between the liquid ejecting surfaces and the cover head 240. Even when wiping, vacuuming operation, or the like, for the liquid ejecting surfaces is performed, it is possible to prevent ink from remaining on the liquid ejecting surfaces. In addition, because the beam portions 244 close the gap between the adjacent head elements 220, ink does not enter into the gap between the adjacent head elements 220 and, therefore, it is possible to prevent degradation and breakage of the piezoelectric elements 300 or driving circuit 110 due to ink. In addition, because the liquid ejecting surfaces of the head elements 220 and the cover head 240 are bonded by an adhesive agent without any gap, by preventing the recorded target medium S from entering into the gaps, it is possible to prevent deformation of the cover head 240 and paper jamming. Furthermore, the side wall portion 245 covers the outer periphery of the plurality of head elements 220, so it is possible to reliably prevent ink from flowing to the side surfaces of the head elements 220. In addition, because the cover head 240 includes the bonded portion 242 that is bonded to the liquid ejecting surfaces of the head elements 220, the nozzle columns 71A of the plurality of head elements 220 may be accurately positioned and then bonded to the cover head 240.

The cover head 240 may be, for example, a metal material, such as stainless steel. The cover head 240 may be formed by pressing a metal plate or may be formed by molding. In addition, the cover head 240 may be grounded by forming the cover head 240 from a conductive metal material. Note that bonding of the cover head 240 with the nozzle plates 70 is not specifically limited. For example, the bonding may use a thermosetting epoxy-based adhesive agent or an ultraviolet curing adhesive agent.

The ink jet recording head 11 of the present embodiment draws ink from the ink cartridges 13 through the liquid supply passages 36 and fills the inside from the reservoirs 100 to the nozzle openings 71 with ink through the ink supply communication passages 231 and the ink introducing ports 144. After that, in accordance with recording signals from the driving circuit 110, the ink jet recording head 11 applies voltages to the piezoelectric elements 300 corresponding to the pressure generating chambers 62 to thereby flexibly deform the elastic films 50 and the piezoelectric elements 300. Thus, pressures in the pressure generating chambers 62 increase to discharge ink droplets from the nozzle openings 71.

Second Embodiment

Figure 9A:
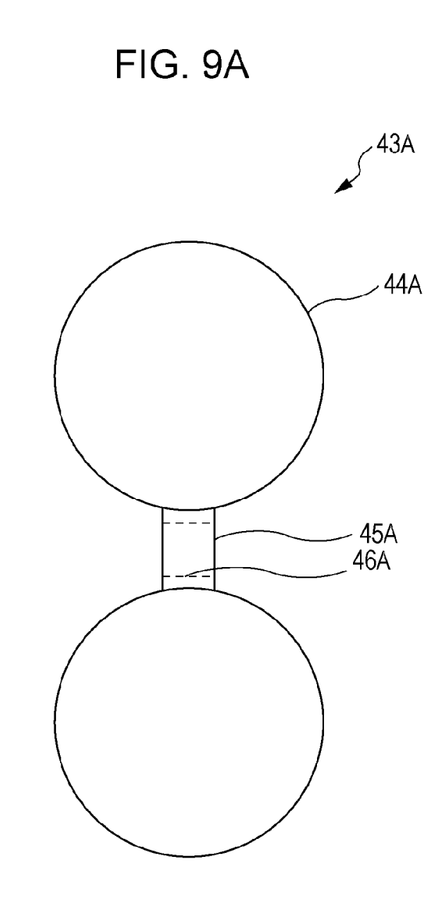
FIG. 9A is a top view of a filter according to a second embodiment of the invention.
Figure 9B:
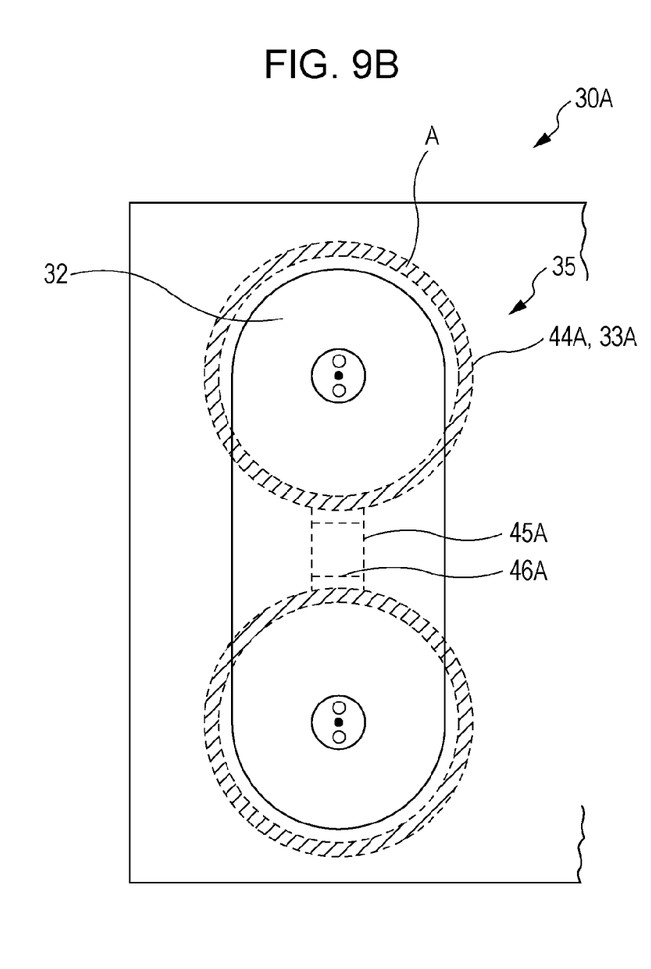
FIG. 9B is a top view of a supply member according to the second embodiment of the invention.

FIG. 9A is a plan view that shows the outer shape of connected filter according to a second embodiment. FIG. 9B is a plan view in the process of manufacturing a supply member according to the second embodiment. The supply member 30A of the present embodiment is formed so that filter element portions 44A of the connected filter 43A have a size corresponding to a region in which a filter 33A at the peripheral portion of each liquid supply passage 36 is held, and resin enters to contact the outer peripheral end surfaces of the filter element portions 44A to form the outer portion 34. Thus, the outer peripheral ends of the filters 33A are reliably sealed by the outer portion 34A, and the supply member element 31, the supply needles 32 and the filters 33A are reliably integrated.

Alternative Embodiment

The embodiments of the invention are described above; however, the basic configuration of the aspects of the invention is not limited to the above described embodiments.

For example, in the above described embodiments, the filter fitting member constitutes the entire supply member element 31. Instead, the supply member element 31 may be divided into the filter 33 side and the head element 220 side, the filter 33 side component may be employed as the filter fitting member and integrated with the filters 33 and the supply needles 32. Note that in this case, the head element 220 side supply member element 31 is assembled to the integrated component to form the supply member 30.

Figure 10:
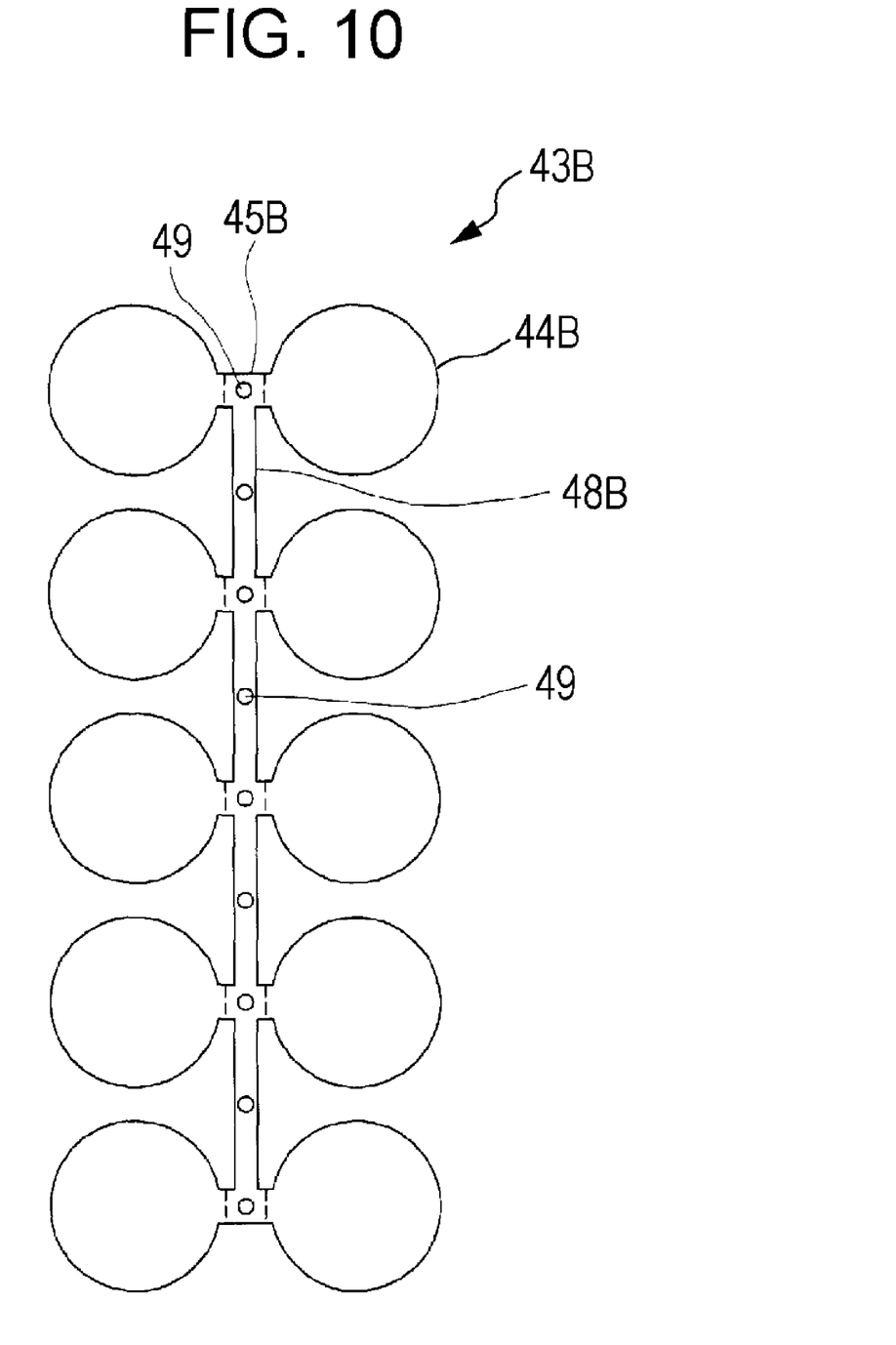
FIG. 10 is a plan view of another example of a filter according to an alternative embodiment of the invention.

In addition, in the above described embodiments, a double connected filter corresponding to the two liquid supply passages 36 may be used. Instead, for example, filters that seal ten liquid supply passages 36 may be connected. FIG. 10 shows an example of a decouple connected filter. The connected filter 43B connects five pairs of filter element portions 44B corresponding to the above described two liquid supply passages 36 connected by a connecting portion 45B using connecting portions 48B, and tear-off lines 46B are provided for the connecting portions 45B. In addition, in order to easily charge resin that forms the outer portion, through-holes 49 are formed in the connecting portions 45B and 48B. Of course, the through-holes 49 need not be provided.

Figure 11:
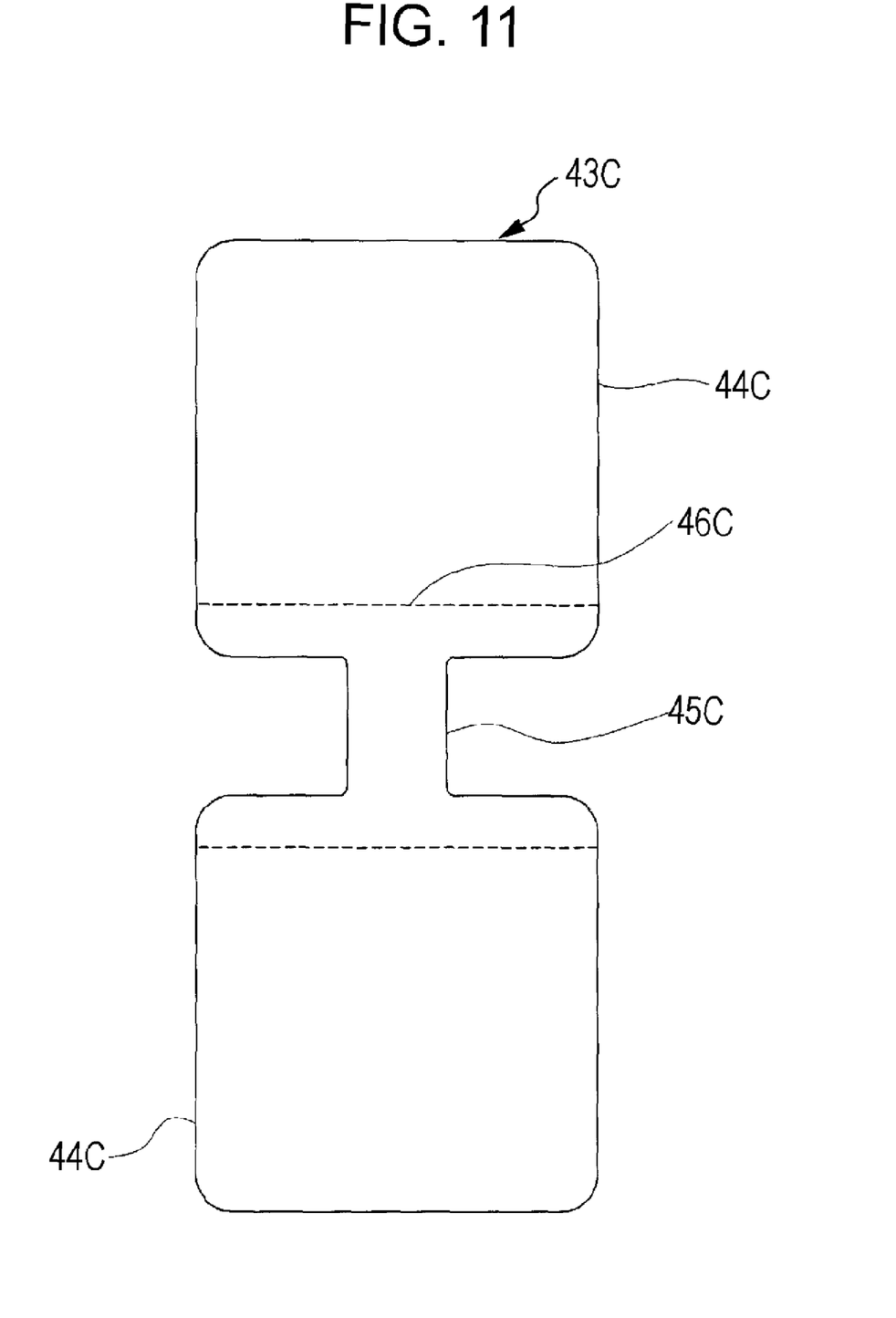
FIG. 11 is a plan view of another example of a filter according to an alternative embodiment of the invention.

In addition, in the above described embodiments, the tear-off line of the filter is perforation. Instead, as long as it integrates the filters for assembling when the filters are placed in the die 200 and is cut off by the pressure of molten resin, it may be a discontinuous tear-off line, a through-hole, or the like, and the shape is not specifically limited. In addition, as long as the connecting portion is torn off to separate the filter element portions, the tear-off line may be provided at the ends of the filter element portions. FIG. 11 shows an example of such filters. A connected filter 43C includes filter element portions 44C and a connecting portion 45C, and tear-off lines 46C are provided at the ends of the filter element portions 44C.

Note that the tear-off lines are not necessarily provided as long as the filters are separated from the connecting portion by charging molten resin; for example, when the connecting portion is formed of a further strip-shaped element as compared with the above described one, it eliminates the necessity of the tear-off lines.

Furthermore, for the filters that are separated from the connecting portion by charging molten resin, the connecting portion may be made of the material as the molten resin or a material such as resin having a melting point lower than the molten resin. By so doing, the connecting portion melts by the heat of molten resin and then the filter elements are separated from the connecting portion.

In addition, in the above described embodiments, the ink cartridges 13, which are the liquid reservoir units, are detachably provided for the supply member 30; however, it is not specifically limited. Instead, for example, an ink tank, or the like, which serves as a liquid reservoir unit, may be provided at a position other than the recording head 11, and then the liquid reservoir unit may be connected to the recording head 11 through a supply pipe, such as a tube. That is, in the above described embodiments, the needle-like supply needle 32 is exemplified as a supply element; however, the supply element is not limited to a needle-like supply element.

In addition, in the above described embodiments, the charging hole facing the connecting portion is provided. Instead, the charging hole may additionally be provided in another region, and then these may communicate with one gate; however, it is desirably designed so that molten metal having a pressure for cutting off the connecting portion flows into the charging hole facing the connecting portion.

In addition, the shape of the connecting portion 45 of the filters need not coincide with the shape of the partition portion 47. For example, in the embodiment shown in FIG. 9A and FIG. 9B, the partition portion 47 may be wider in the widthwise direction of the connecting portion 45 of the connected filter 43 than the connecting portion 45. In this case, the connecting portion 45 of the connected filter 43 is further easily cut off, and resin easily flows to the surroundings.

Furthermore, in the above described embodiments, the configuration that one head element 220 is provided for the plurality of liquid supply passages 36 is exemplified. Instead, a plurality of head elements may be provided for each ink color. In this case, it may be configured so that each liquid supply passage 36 communicates with a corresponding one of the head elements, that is, each liquid supply passage 36 communicates with nozzle openings provided for each head element and arranged parallel to one another column by column. Of course, the liquid supply passage 36 need not communicate with nozzle openings column by column; one liquid supply passage 36 may communicate with a plurality of nozzle columns or one nozzle column may be divided into two groups and then the liquid supply passages 36 may respectively communicate with the two groups. That is, it is only necessary that the liquid supply passage 36 communicates with a nozzle opening group formed of a plurality of nozzle openings.

Furthermore, in the above described embodiments, the aspects of the invention are described using an example of the ink jet recording head 11 that discharges ink droplets; however, the aspects of the invention widely encompass general liquid ejecting heads. The liquid ejecting head may be, for example, a recording head used in an image recording apparatus, such as a printer, a color material ejecting head used for manufacturing a color filter, such as a liquid crystal display, an electrode material ejecting head used for forming an electrode of an organic EL display, an FED (field emission display), or the like, a bio-organic material ejecting head used for manufacturing a bio-chip, or the like.

The entire disclosure of Japanese Patent Application No. 2008-040627, filed Feb. 21, 2008 is incorporated by reference herein.

What is claimed is:

1. A method of manufacturing a liquid ejecting head that includes a head element having nozzle openings for ejecting liquid supplied from a liquid reservoir unit, which stores the liquid, and a supply member having a plurality of liquid supply passages, each of which supplies the liquid to a groups of the plurality of nozzle openings of the head element, wherein the supply member includes first and second supply members in which the liquid supply passages are provided and filters provided between the first supply member and the second supply member, the method comprising:

preparing a connected filter formed of a plurality of filter element portions corresponding to the plurality of liquid supply passages and a connecting portion that connects the plurality of filter element portions;

in a state where the filter element portions of the connected filter are held between the first supply member and the second supply member, charging molten resin from a position corresponding to the connecting portion of the connected filter to separate the connecting portion; and during the charging, integrally molding an outer portion that fixes the first supply member, the second supply member and the filters.

2. The method of manufacturing a liquid ejecting head according to claim 1, wherein a partition portion molding portion, which is a cavity for molding a partition portion that partitions the filter element portions, is formed in a region, corresponding to the connecting portion of the connected filter, of a die into which the molten resin is charged, and wherein the connecting portion is suspended within the partition portion molding portion when the connected filter is placed in the die.

3. The method of manufacturing a liquid ejecting head according to claim 1, wherein at least portion of the connecting portion of the connected filter is formed in a strip element that is narrower than the filter element portions.

4. The method of manufacturing a liquid ejecting head according to claim 1, wherein tear-off lines that facilitates separation by pressure of the molten resin are formed in the connecting portion of the connected filter.

5. The method of manufacturing a liquid ejecting head according to claim 1, wherein the connecting portion of the connected filter is made of a material that melts by heat of the molten resin.

6. The method of manufacturing a liquid ejecting head according to claim 1, wherein a through-hole is formed in the connecting portion in a region corresponding to a charging hole through which the molten resin is charged.

7. The method of manufacturing a liquid ejecting head according to claim 1, wherein each filter has an outer shape corresponding to a filter holding portion of a peripheral portion of a corresponding one of the liquid supply passages, and wherein the outer portion extends continuously to an outer peripheral end surfaces of the filter in a gap between the first supply member and the second supply member.

* * * * *